(12) United States Patent
Schwarz et al.

(10) Patent No.: US 8,428,143 B2
(45) Date of Patent: Apr. 23, 2013

(54) CODING SCHEME ENABLING PRECISION-SCALABILITY

(75) Inventors: Heiko Schwarz, Berlin (DE); Thomas Wiegand, Berlin (DE); Tobias Hinz, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1575 days.

(21) Appl. No.: 11/854,375

(22) Filed: Sep. 12, 2007

(65) Prior Publication Data

US 2008/0002767 A1 Jan. 3, 2008

Related U.S. Application Data

(63) Continuation of application No. PCT/EP2006/002634, filed on Mar. 22, 2006.

(51) Int. Cl.
*H04N 11/02* (2006.01)

(52) U.S. Cl.
USPC .............................. 375/240.25; 375/240.16

(58) Field of Classification Search ..... 375/240.01–242; 348/43–222; 382/166–239; 386/241–269
See application file for complete search history.

(56) References Cited

U.S. PATENT DOCUMENTS

| | | | |
|---|---|---|---|
| 4,974,171 A | 11/1990 | Yeh et al. | |
| 5,144,424 A | 9/1992 | Savatier | |
| 5,253,055 A | 10/1993 | Civanlar et al. | |
| 5,533,173 A | 7/1996 | Wober et al. | |
| 5,668,890 A | 9/1997 | Winkelman | |
| 5,671,298 A | 9/1997 | Markandey et al. | |
| 6,023,527 A | 2/2000 | Narahara | |
| 6,094,454 A | 7/2000 | Mitchell et al. | |
| 7,333,545 B2* | 2/2008 | Duruoz et al. | 375/240.25 |
| 7,450,643 B2* | 11/2008 | Chujoh et al. | 375/240.16 |
| 7,924,921 B2* | 4/2011 | Crinon et al. | 375/240.16 |
| 2002/0041632 A1* | 4/2002 | Sato et al. | 375/240.25 |
| 2003/0035127 A1 | 2/2003 | Nakami | |
| 2003/0108250 A1 | 6/2003 | Luo et al. | |
| 2005/0002646 A1* | 1/2005 | Sato | 386/68 |
| 2005/0129130 A1 | 6/2005 | Shen et al. | |
| 2005/0195900 A1* | 9/2005 | Han | 375/240.21 |
| 2005/0259730 A1 | 11/2005 | Sun | |
| 2005/0265449 A1 | 12/2005 | Yoon | |

(Continued)

FOREIGN PATENT DOCUMENTS

| | | |
|---|---|---|
| JP | 2002-247375 | 8/2002 |
| JP | 2004-112566 | 4/2004 |
| WO | 2007/042063 A1 | 4/2007 |
| WO | WO 2007/042063 A1 | 4/2007 |

OTHER PUBLICATIONS

INSPECsearch for NPL (added on record).*
Google-patent history search for NPL (added on record).*

(Continued)

*Primary Examiner* — William C Vaughn, Jr.
*Assistant Examiner* — Luis M Perez Fuentes
(74) *Attorney, Agent, or Firm* — Michael A. Glenn; Glenn Patent Group

(57) ABSTRACT

An improved coding efficiency is achieved by giving the encoder the opportunity to change the field/frame-wise treatment of individual picture portions between the first precision-encoded data and the second precision-encoded data, with the second precision being higher than the first precision.

22 Claims, 6 Drawing Sheets

U.S. PATENT DOCUMENTS

2007/0065005 A1* 3/2007 Cha et al. .................. 382/166
2009/0168894 A1   7/2009 Marpe et al.
2011/0001642 A1* 1/2011 Yu et al. ..................... 341/65

OTHER PUBLICATIONS

NPL_MPEG2 video codec using image compression DSP.pdf.*
English Translation of Office Action mailed Jan. 5, 2011 in related Japanese Patent Application 2008-549767, 2 pages.
Van Rijsselbergen, D., "YCoCg(-R) Color Space Conversion on the GPU", Sixth FirW PhD Symposium, Faculty of Engineering, Ghent University, paper No. 102, Nov. 30, 2005, 2 pages.
Hinz, et al.; "First concepts for inter-layer prediction with MBAFF frames"; Joint Video Team (JVT) of ISO/IEC MPEG & ITU-T VCEG, 18$^{th}$ Meeting; Bangkok, Thailand, document JVT-R063, 14, Jan. 2006.
Translation of Chinese Office Action dated Mar. 12, 2010, for parallel application No. 200680050961.7, 3 pages.
Park, S.W. et al.; "Inter layer motion prediction of SVC interlaced coding"; DM Research Lab, LG Electronics; Joint Video Team (JVT) of ISO/IEC MPEG & ITU-T VCEG, 18th Meeting, Bangkok, Thailand, document JVT-R030, Jan. 14-20, 2006, 14 pages.
J. Vieron et al.: "CE4: Inter-layer prediction for interlace/progressive SVC", Joint Video Team (JVT) of ISO/IEC MPEG & ITU-T VCEG, 19th Meeting, Genova, Switzerland, document JVT-S018, Apr. 1-7, 2006, 16 pages.
H. Schwarz et al.: "Constrained Inter-Layer Prediction for Single-Loop Decoding in Spatial Scalability", 0-7803-9134-9/05, Sep. 2005 IEEE, 4 pages.
Communication from the EPO "Result of consultation" mailed on Jul. 15, 2010 in related European application No. 06723626, 5 pages.
Hinz, Tobias, et al., "FGS for Field Pictures and MBAFF Frames,"Jan. 14-20, 2000, Joint Video Team (JVT) of ISO/IEC MPEG & ITU-T VCEG, 18$^{th}$ Meeting: Bangkok, Thailand.
Reichel, Julien, et al., "Joint Scalable Video Model JSVM-4," Oct. 2005, Joint Video Team (JVT) of ISO/IEC MPEG & ITU-T VCEG, 17$^{th}$ Meeting: Nice, France.
Marpe, Detlev, et al., "MB-Adaptive Residual Colour Transform for 4:4:4 Coding," Jan. 14-20, 2000, Joint Video Team (JVT) of ISO/IEC MPEG & ITU-T VCEG, 18$^{th}$ Meeting: Bangkok, Thailand.
Winken, Martin, et al., "Adaptive Motion Refinement for FGS Slices," Oct. 2005, Joint Video Team (JVT) of ISO/IEC MPEG & ITU-T VCEG, 17$^{th}$ Meeting: Nice, France.
Reichel, Julien, et al., "Draft of Joint Scalable Video Model JSVM-4 Annex G," Oct. 2005, Joint Video Team (JVT) of ISO/IEC MPEG & ITU-T VCEG, 17$^{th}$ Meeting: Nice, France.
Sullivan, Gary, et al., "Editors' Text for ISO/IEC," Apr. 2005, AVC 3$^{rd}$ Edition, Busan, KR.
Reichel, Julien, et al., "Scalable Video Coding—Join Draft 4," Oct. 2005, Joint Video Team (JVT) of ISO/IEC MPEG & ITU-T VCEG, 17$^{th}$ Meeting: Nice, France.
International Telecommunication Union, "Advanced Video Coding for Generic Audiovisual Services," Mar. 2005, Telecommunication Standardization Sector of ITU.

* cited by examiner

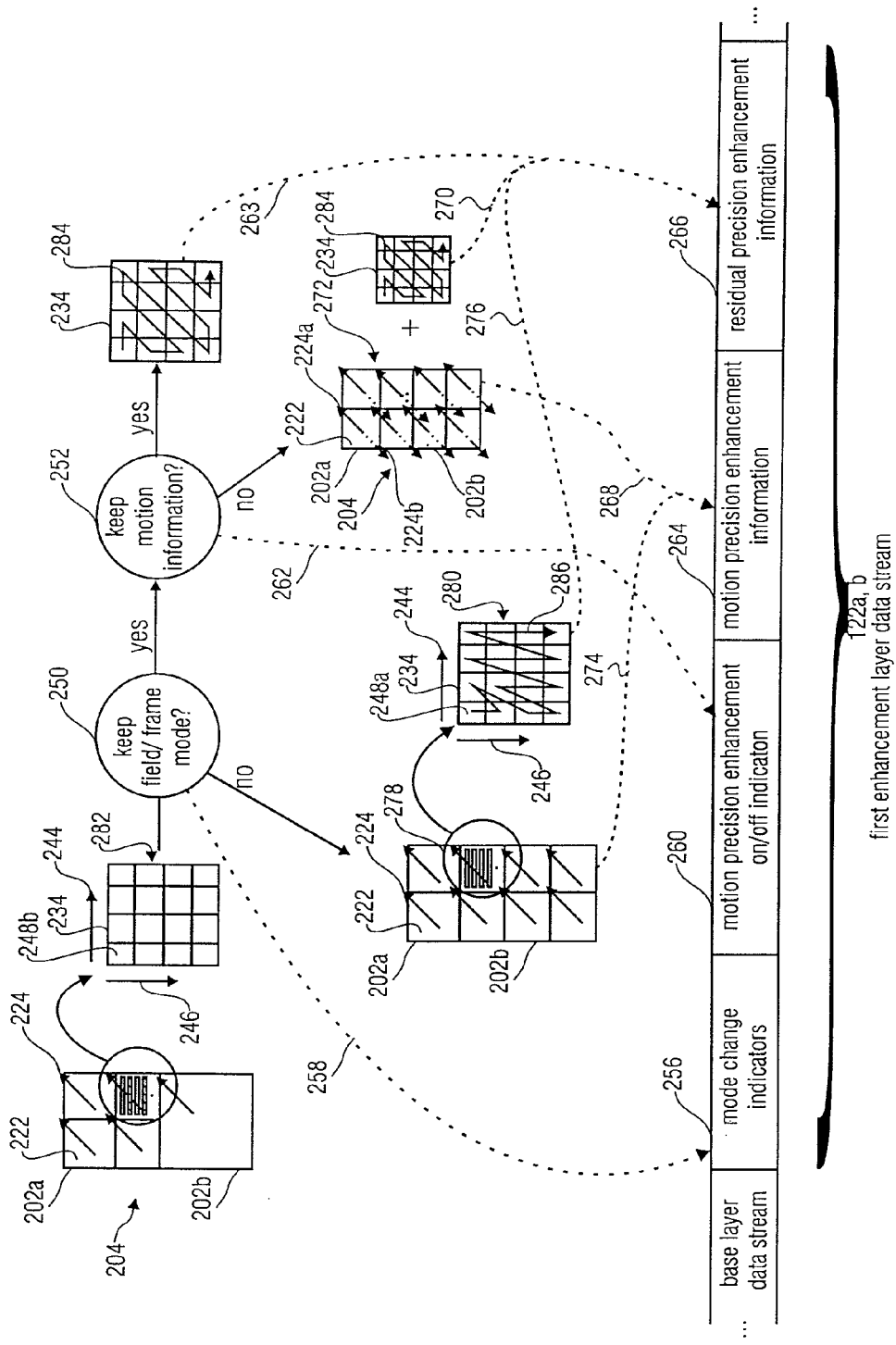

CODING SCHEME ENABLING PRECISION-SCALABILITY

CROSS-REFERENCE TO RELATED APPLICATIONS

This application is a continuation of copending International Application No. PCT/EP2006/002634, filed Mar. 22, 2006, which designated the United States and was not published in English.

TECHNICAL FIELD

The present invention relates to picture or video coding supporting quality-, precision- or SNR-scalability.

BACKGROUND

A current project of the Joint Video Team (JVT) of the ISO/IEC Moving Pictures Experts Group (MPEG) and the ITU-T Video Coding Experts Group (VCEG) is the development of a scalable extension of the state-of-the-art video coding standard H.264/MPEG4-AVC defined in ITU-T Rec. & ISO/IEC 14496-10 AVC, "Advanced Video Coding for Generic Audiovisual Services," version 3, 2005. The current working draft as described in J. Reichel, H. Schwarz and M. Wien, eds., "Scalable Video Coding—Joint Draft 4, "Joint Video Team, Doc. JVT-Q201, Nice, France, October 2005 and J. Reichel, H. Schwarz and M. Wien, eds., "Joint Scalable Video Model JSVM-4," Joint Video Team, Doc. JVT-Q202, Nice, France, October 2005, supports temporal, spatial and SNR scalable coding of video sequences or any combination thereof.

H.264/MPEG4-AVC as described in ITU-T Rec. & ISO/IEC 14496-10 AVC, "Advanced Video Coding for Generic Audiovisual Services, "version 3, 2005, specifies a hybrid video codec in which macroblock prediction signals are either generated by motion-compensated prediction or intra-prediction and both predictions are followed by residual coding. H.264/MPEG4-AVC coding without the scalability extension is referred to as single-layer H.264/MPEG4-AVC coding. Rate-distortion performance comparable to single-layer H.264/MPEG4-AVC means that the same visual reproduction quality is typically achieved at 10% bit-rate. Given the above, scalability is considered as a functionality for removal of parts of the bit-stream while achieving an R-D performance at any supported spatial, temporal or SNR resolution that is comparable to single-layer H.264/MPEG4-AVC coding at that particular resolution.

The basic design of the scalable video coding (SVC) can be classified as layered video codec. In each layer, the basic concepts of motion-compensated prediction and intra prediction are employed as in H.264/MPEG4-AVC. However, additional inter-layer prediction mechanisms have been integrated in order to exploit the redundancy between several spatial or SNR layers. SNR scalability is basically achieved by residual quantization, while for spatial scalability, a combination of motion-compensated prediction and oversampled pyramid decomposition is employed. The temporal scalability approach of H.264/MPEG4-AVC is maintained.

In general, the coder structure depends on the scalability space that is advantageously by an application. For illustration, FIG. 5 shows a typical coder structure 900 with two spatial layers 902a, 902b. In each layer, an independent hierarchical motion-compensated prediction structure 904a,b with layer-specific motion parameters 906a,b is employed. The redundancy between consecutive layers 902a,b is exploited by inter-layer prediction concepts 908 that include prediction mechanisms for motion parameters 906a,b as well as texture data 910a,b. A base representation 912a,b of the input pictures 914a,b of each layer 902a,b is obtained by transform coding 916a,b similar to that of H.264/MPEG4-AVC, the corresponding NAL units (NAL—Network Abstraction Layer) contain motion information and texture data; the NAL units of the base representation of the lowest layer, i.e. 912a, are compatible with single-layer H.264/MPEG4-AVC. The reconstruction quality of the base representations can be improved by an additional coding 918a,b of so-called progressive refinement slices; the corresponding NAL units can be arbitrarily truncated in order to support fine granular quality scalability (FGS) or flexible bit-rate adaptation.

The resulting bit-streams output by the base layer coding 916a,b and the progressive SNR refinement texture coding 918a,b of the respective layers 902a,b, respectively, are multiplexed by a multiplexer 920 in order to result in the scalable bit-stream 922. This bit-stream 922 is scalable in time, space and SNR quality.

Summarizing, in accordance with the above scalable extension of the Video Coding Standard H.264/MPEG4-AVC, the temporal scalability is provided by using a hierarchical prediction structure. For this hierarchical prediction structure, the one of single-layer H.264/MPEG4-AVC standards may be used without any changes. For spatial and SNR scalability, additional tools have to be added to the single-layer H.264/MPEG4.AVC. All three scalability types can be combined in order to generate a bit-stream that supports a large degree on combined scalability.

For SNR scalability, coarse-grain scalability (CGS) and fine-granular scalability (FGS) are distinguished. With CGS, only selected SNR scalability layers are supported and the coding efficiency is optimized for coarse rate graduations as factor 1.5-2 from one layer to the next. FGS enables the truncation of NAL units at any arbitrary and eventually byte-aligned point. NAL units represent bit packets, which are serially aligned in order to represent the scalable bit-stream 922 output by multiplexer 920.

In order to support fine-granular SNR scalability, so-called progressive refinement (PR) slices have been introduced. Progressive refinement slices contain refinement information for refining the reconstruction quality available for that slice from the base layer bit-stream 912a,b, respectively. Even more precise, each NAL unit for a PR slice represents a refinement signal that corresponds to a bisection of a quantization step size (QP increase of 6). These signals are represented in a way that only a single inverse transform has to be performed for each transform block at the decoder side. In other words, the refinement signal represented by a PR NAL unit refines the transformation coefficients of transform blocks into which a current picture of the video has been separated. At the decoder side, this refinement signal may be used to refine the transformation coefficients within the base layer bit-stream before performing the inverse transform in order to reconstruct the texture of prediction residual used for reconstructing the actual picture by use of a spatial and/or temporal prediction, such as by means of motion compensation.

The progressive refinement NAL units can be truncated at any arbitrary point, so that the quality of the SNR base layer can be improved in a fine granular way. Therefore, the coding order of transform coefficient levels has been modified. Instead of scanning the transform coefficients macroblock-by-macroblock, as it is done in (normal) slices, the transform coefficient blocks are scanned in separate paths and in each path, only a few coding symbols for a transform coefficient block are coded. With the exception of the modified coding order, the CABAC entropy coding as specified in H.264/MPEG4-AVC is re-used.

An improvement of the coder structure shown in FIG. 5 has been described in M. Winken, H. Schwarz, D. Marpe, and T. Wiegand, "Adaptive motion refinement for FGS slices," Joint Video Team, Doc. JVT-Q031, Nice, France, October 2005. In particular, as described there, a concept for fine-granular SNR scalable coding of video sequences with an adaptive refinement of motion/prediction information is added to the coding structure of FIG. 5. The approach of adaptive motion information refinement for SNR scalable video coding enables the video encoder of FIG. 5 the choice to select a, in rate-distortion (RD) sense, better tradeoff between bit rate for coding of residual and motion data. In particular, as indicated by the dashed lines 924a and 924b in FIG. 5, the refinement coding blocks 918a and 918b additionally decide, for each macroblock in a progressive refinement slice which corresponds to a base layer slice that supports motion-compensated prediction (so-called P- and B-slices), which of the two following possible coding modes is to be used. In particular, according to a first mode, coding block 918a,b uses the same motion information as the SNR base layer and thus transmits only a refinement of the residual data. This mode is equal to the foregoing description of the functionality of the coding structure of FIG. 5. However, in the alternative coding mode, coding block 918a,b transmits new motion information together with a new residual within the refinement slice information. Both the new motion and residual data can be predicted from the SNR subordinate layer to achieve a better RD-performance. The possible motion modes are the same as supported by the video coding standard H.264/MPEG 4-AVC, which means that by subdivision of the macroblocks into smaller blocks for motion-compensated prediction up to 16 motion vectors for P-slices and up to 32 motion vectors for B-slices can be signalled.

The decision between the two coding modes with respect to the motion information performed by blocks 918a,b is made using a Lagrangian approach where a Lagrangian cost functional J=D+λR is minimized for a given λ. Here, D stands for the distortion between original and reconstructed (decoded) signal and R gives the bit rate needed for coding of the macroblock. If the cost for refining only the residual data is higher than the cost for one of the possible motion refinement modes, it is in rate-distortion sense obviously better to transmit a new set of motion information for this macroblock. Consequently, using adaptive motion information refinement it is possible to achieve a higher picture quality at the same bit rate.

The above-explained scalable extensions of the video coding standard H.264/MPEG 4-AVC work well with progressive source material, i.e. videos in which the pictures may be effectively handled picture- or frame-wise, i.e. irrespective of their composition from a top and a bottom field. However, it would be desirable to have a coding structure that enables precision-scalability with a better RD-performance for interlaced source material, i.e. videos in which each frame is composed of two interleaved fields with the fields being individually handled like frames (field-coded) or with macroblock pair-wise deciding as to whether the respective macroblock portion is divided up into two macroblocks in accordance with the membership of to the top or bottom field or the membership to the top or bottom half of the macroblock pair area within the frame.

SUMMARY

According to an embodiment, a decoder for decoding an encoded precision-scalable data stream encoding a predetermined picture, the encoded precision-scalable data stream including first precision-encoded data having the predetermined picture encoded therein with a first precision by treating a predetermined portion of the predetermined picture a first one of frame-wise and field-wise, higher precision information representing second precision encoded data having the predetermined portion encoded therein with a second precision higher than the first precision by treating the predetermined portion a second one of frame-wise and field-wise, or refinement information enabling refining the first precision-encoded data to obtain the second precision-encoded data, and indication information indicating an absence or existence of a change in the frame-/field-wise treatment between the first precision-encoded data and the second precision-encoded data may have: a checker for checking the indication information as to whether same indicates a change in the frame-/field-wise treatment of the predetermined portion between the first precision-encoded data and the second precision-encoded data; an arranger for, if the indication information indicate the frame-/field-wise treatment change, disregarding, at least partially, the first precision-encoded data with respect to the predetermined portion and arranging, instead, the second precision-encoded data as data for decoding, or, based on the higher precision information, refining the first precision-encoded data to obtain the second precision-encoded data and arranging the obtained second precision-encoded data as data for decoding; and a decoder for decoding the arranged data for decoding by treating the predetermined portion of the predetermined picture the one of frame-wise or field-wise to reconstruct the predetermined picture with the second precision.

According to another embodiment, an encoder for encoding a predetermined picture may have: a base encoder for, by treating a predetermined portion of a predetermined picture one of frame-wise or field-wise, encoding the predetermined picture with a first precision to obtain first precision-encoded data; a determiner for determining higher precision information by treating the predetermined portion the other of frame-wise or field-wise, the higher precision information representing second precision-encoded data having encoded therein the predetermined portion with a second precision being higher than the first precision by treating the predetermined portion the other of frame-wise and field-wise or refinement information enabling refining the first precision-encoded data to obtain the second precision-encoded data; and a constructor for constructing an encoded precision-scalable data stream encoding the predetermined picture to include the first precision-encoded data, the higher precision information and indication information indicating a change in the frame-/field-wise treatment of the predetermined portion between the first precision-encoded data and the second precision-encoded data.

According to another embodiment, a precision-scalable bit-stream having encoded therein a predetermined picture may have: precision-encoded data having the predetermined picture encoded therein with a first precision by treating a predetermined portion of the predetermined picture a first one of frame-wise and field-wise; higher precision information representing second precision encoded data having the predetermined portion encoded therein with a second precision higher than the first precision by treating the predetermined portion a second one of frame-wise and field-wise, or refinement information enabling refining the first precision-encoded data to obtain the second precision-encoded data; and indication information indicating an absence or existence of a change in the frame-/field-wise treatment between the first precision-encoded data and the second precision-encoded data.

According to another embodiment, a method for decoding an encoded precision-scalable data stream encoding a predetermined picture, the encoded precision-scalable data stream including first precision-encoded data having the predetermined picture encoded therein with a first precision by treating a predetermined portion of the predetermined picture a first one of frame-wise and field-wise, higher precision information representing second precision encoded data having the predetermined portion encoded therein with a second precision higher than the first precision by treating the predetermined portion a second one of frame-wise and field-wise, or refinement information enabling refining the first precision-encoded data to obtain the second precision-encoded data, and indication information indicating an absence or existence of a change in the frame-/field-wise treatment between the first precision-encoded data and the second precision-encoded data may have the steps of: checking the indication information as to whether same indicates a change in the frame-/field-wise treatment of the predetermined portion between the first precision-encoded data and the second precision-encoded data; if the indication information indicate the frame-/field-wise treatment change, disregarding, at least partially, the first precision-encoded data with respect to the predetermined portion and arranging, instead, the second precision-encoded data as data for decoding, or, based on the higher precision information, refining the first precision-encoded data to obtain the second precision-encoded data and arranging the obtained second precision-encoded data as data for decoding; and decoding the arranged data for decoding by treating the predetermined portion of the predetermined picture the one of frame-wise or field-wise to reconstruct the predetermined picture with the second precision.

According to another embodiment, a method for encoding a predetermined picture may have the steps of: by treating a predetermined portion of a predetermined picture one of frame-wise or field-wise, encoding the predetermined picture with a first precision to obtain first precision-encoded data; determining higher precision information by treating the predetermined portion the other of frame-wise or field-wise, the higher precision information representing second precision-encoded data having encoded therein the predetermined portion with a second precision being higher than the first precision by treating the predetermined portion the other of frame-wise and field-wise or refinement information enabling refining the first precision-encoded data to obtain the second precision-encoded data; and constructing an encoded precision-scalable data stream encoding the predetermined picture to include the first precision-encoded data, the higher precision information and indication information indicating a change in the frame-/field-wise treatment of the predetermined portion between the first precision-encoded data and the second precision-encoded data.

The basic idea underlying the present invention is that an improved coding efficiency may be achieved by giving the encoder the opportunity to change the field/frame-wise treatment of individual picture portions between the first precision-encoded data and the second precision-encoded data, with the second precision being higher than the first precision.

In accordance with an embodiment of the present invention, a concept for fine-granular SNR scalable coding of interlaced frames is achieved by making and coding the frame/field decision in a progressive refinement slice independently of the frame/field decision of the corresponding base quality slice. Compared thereto, the above-described scalable extensions of the H.264/MPEG 4-AVC standard not supporting motion information refinement, merely code a refinement of the transform coefficients. The motion and prediction information is copied from the corresponding base layer slice. Furthermore, the tools for supporting SNR and spatial scalability have only been designed for progressive source material. Special tools for increasing the coding efficiency for interlaced source material have not been incorporated. According to the aforementioned scalable extension including motion information refinement, the FGS coding scheme allows the adaptive refinement of motion and prediction information for improving the coding efficiency of the fine-granular SNR scalable coding especially for large bit-rate intervals. However, also the latter FGS coding scheme has only been designed for progressive source material.

The below-explained FGS coding scheme embodiment extends the above-described motion information refinement scalable extension in a way that it also supports a revision of the frame/field decision of the co-located macroblock pair and the base quality slice, thereby enabling achieving a precision-scalable data stream with an improved R/D ratio.

BRIEF DESCRIPTION OF THE DRAWINGS

Embodiments of the present invention will be detailed subsequently referring to the appended drawings, in which:

FIG. 3b a schematic block diagram illustrating the mode of operation of the encoder of FIG. 1 with respect to the creation of the first enhancement layer;

DETAILED DESCRIPTION

Figure 1:
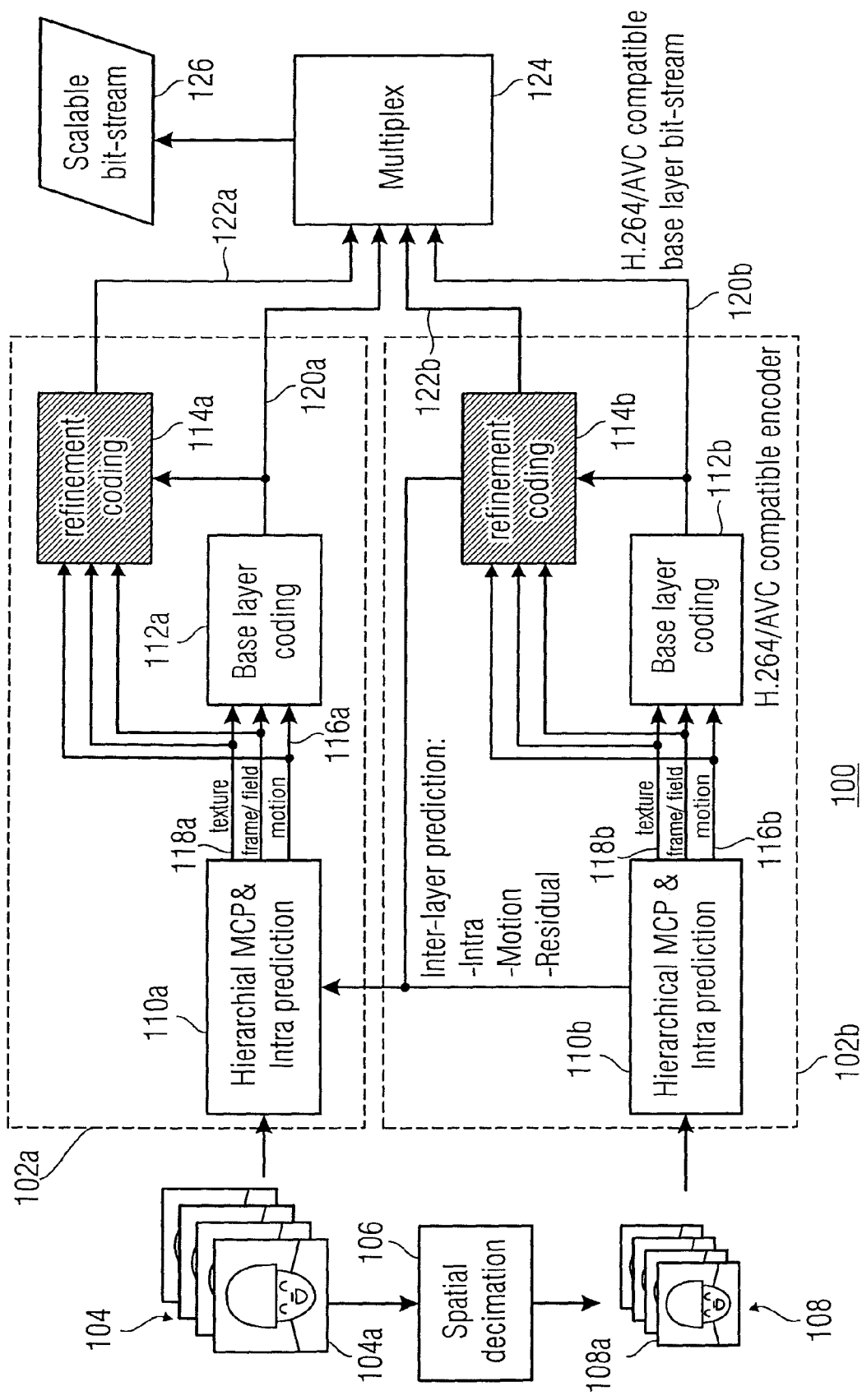
FIG. 1 a block diagram of a video encoder according to an embodiment of the present invention.
Figure 5:
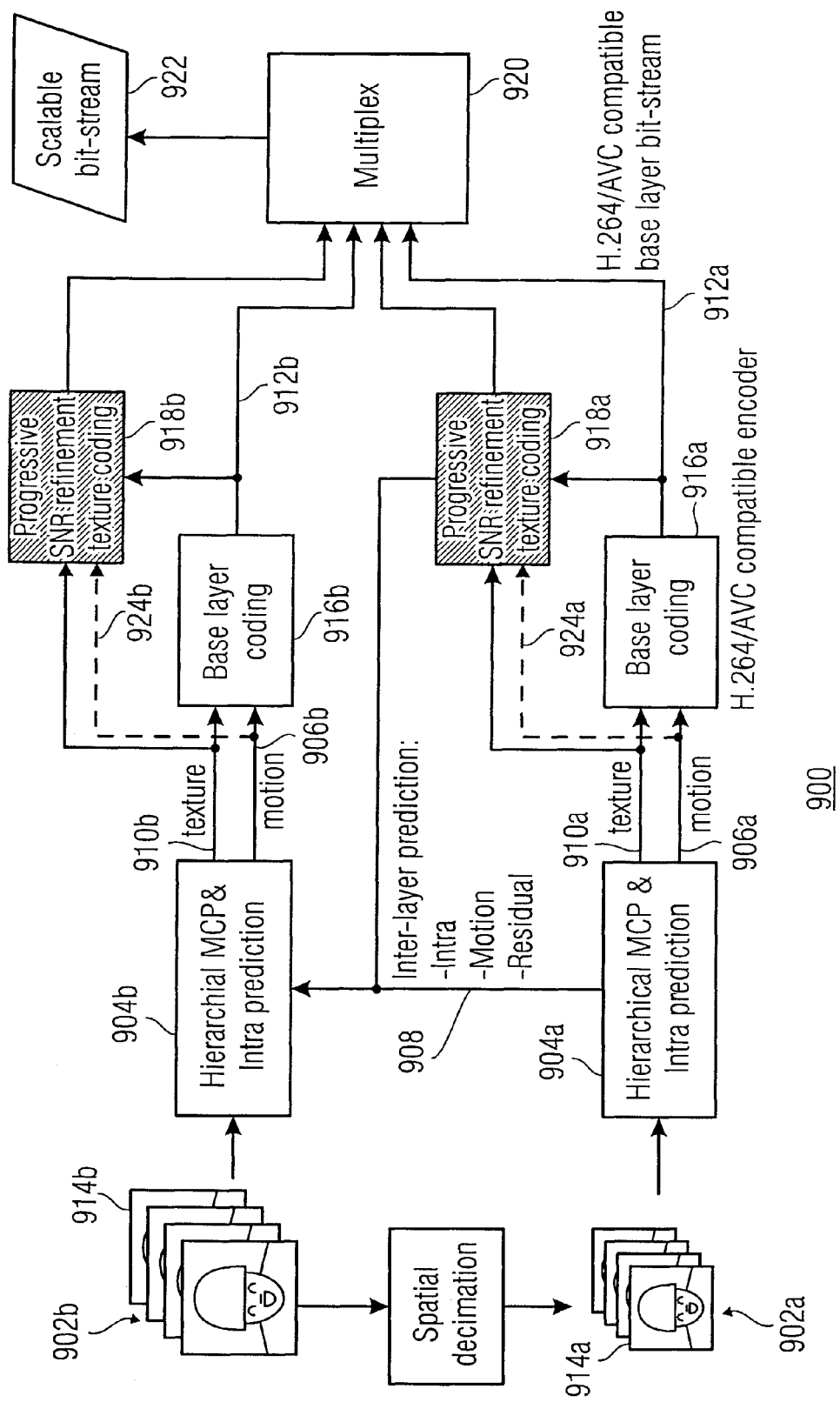
FIG. 5 a conventional coder structure for scalable video coding.

The present invention is described in the following by means of an embodiment with a similar structure to the conventional coder structure of FIG. 5. However, in order to more clearly indicate the improvements in accordance with the present invention, the video encoder of FIG. 1 representing an embodiment of the present invention is firstly described as operating in accordance with the scalable extensions of the H.264/MPEG4-AVC standard having been presented in the introductory portion of this specification with respect to FIG. 5. Thereafter, the actual operation of the encoder FIG. 1 is illustrated by emphasizing the differences to the mode of operation in accordance with the video structure of FIG. 5. As will turn out from this discussion, the differences reside in the refinement coding means.

The video coder of FIG. 1 operating as defined in the above-mentioned Joint Drafts supports two spatial layers. To this end, the encoder of FIG. 1, which is generally indicated by 100, comprises two layer portions or layers 102a and 102b, among which layer 102b is dedicated for generating that part of the desired scalable bit-stream concerning a coarser spatial resolution, while the other layer 102a is dedicated for supplementing the bit-stream output by layer 102b with information concerning a higher resolution representation of an input video signal 104. Therefore, the video signal 104 to be encoded by encoder 100 is directly input into layer 102a, whereas encoder 100 comprises a spatial decimeter 106 for spatially decimating the video signal 104 before inputting the resulting spatially decimated video signal 108 into layer 102b.

The decimation performed in spatial decimeter 106 comprises, for example, decimating the number of pixels for each picture 104a of the original video signal 104 by a factor of 4 by means of discarding every second pixel in column and row directions.

The low-resolution layer 102b comprises a motion-compensated prediction block 110b, a base layer coding block 112b and a refinement coding block 114b. The prediction block 110b performs a motion-compensated prediction on pictures 108a of the decimated video signal 108 in order to predict pictures 108a of the decimated video signal 108 from other reference pictures 108a of the decimated video signal 108. For example, for a specific picture 108a, the prediction block 110b generates motion information that indicates as to how this picture may be predicted from other pictures of the video signal 108, i.e. from reference pictures. In particular, to this end, the motion information may comprise pairs of motion vectors and associated reference picture indices, each pair indicating, for example, how a specific part or macroblock of the current picture is predicted from an index reference picture by displacing the respective reference picture by the respective motion vector. Each macroblock may be assigned one or more pairs of motion vectors and reference picture indices. Moreover, some of the macroblocks of a picture may be intra-predicted, i.e. predicted by use of the information of the current picture. In particular, the prediction block 110b may perform a hierarchical motion-compensator prediction on the decimated video signal 108.

The prediction block 110b outputs the motion information 116b as well as the prediction residuals of the video texture information 118b representing the differences between the predictors and the actual decimated pictures 108a. In particular, the determination of the motion information and the texture information 116b and 118b and prediction block 110b is performed such that the resulting encoding of this information by means of the subsequent base layer coding 110b results in a base-representation bit-stream with, advantageously, optimum rate-distortion performance.

As already described above, the base layer coding block 112b receives the first motion information 116b and the texture information 118b from block 110b and encodes the information to a base-representation bit-stream 120b. The encoding performed by block 112b comprises a transformation and a quantization of the texture information 118b. In particular, the quantization used by block 112b is relatively coarse. Thus, in order to enable quality—or precision—up scaling of the bit-stream 120b, the refinement coding block 114b supports the bit-stream 120b with additional bit-streams for various refinement layers containing information for refining the coarsely quantized transform coefficients representing the texture information in bit-stream 120b. As discussed later in more detail, refinement coding block 114b—for example, in co-operation with the prediction block 110b—is also able to decide that a specific refinement layer bit-stream 122b should be accompanied by refined motion information 116b, a functionality that has also been described in the above-mentioned scalable extension. However, this functionality is, according to the embodiment of the present invention, related to the functionality of newly coding the frame/field decision, and therefore these functionalities shall collectively be described hereinafter. The refinement of the residual texture information relative to the base representation 120b of the formerly-output lower refinement layer bit-stream 122b comprises, for example, the encoding of the current quantization error of the transform coefficients thereby representing the texture information 118b with a finer quantization prediction.

Both bit-streams 120b and 122b are multiplexed by a multiplexer 124 comprised by encoder 100 in order to insert both bit-streams into the final scalable bit-stream 126 representing the output of encoder 100.

Layer 102a substantially operates the same as layer 102b. Accordingly, layer 102a comprises a motion-compensation prediction block 110a, a base layer coding block 112a and a refinement coding block 114a. In conformity with layer 102b, the prediction block 110a receives the video signal 104 and performs a motion-compensated prediction thereon in order to obtain motion information 116a and texture information 118a. The output motion and texture information 116a and 118a are received by coding block 112a, which encodes this information to obtain the base representation bit-stream 120a. The refinement coding block 114a codes refinements of the quantization error manifesting itself on the base representation 120a by comparing a transformation coefficient of bit-stream 120a and the actual transformation coefficient resulting from the original texture information 118a and, accordingly, outputs refinement-layer bit-streams 122a for various refinement layers.

The only difference between layers 102a and 102b is that layer 102a is inter-layer predicted. That is, the prediction block 110a uses information derivable from layer 102b, such as residual texture information, motion information or a reconstructed video signal, as derived from one or more of the bit-streams 120b and 122b in order to pre-predict the high-resolution pictures 104a of the video signal 104, thereafter performing the motion-compensated prediction on the pre-prediction residuals, as mentioned above with respect to prediction block 110b relative to the decimated video signal 108. Alternatively, the prediction block 110a uses the information derivable from layer 102b for predicting the motion compensated residual 118a. In this case, for intra blocks, picture content 104a may be predicted by means of the reconstructed base layer picture. For inter blocks 104a, the motion vector(s) 116a output from 110a may be predicted from the corresponding reconstructed base layer motion vector. Moreover, after the motion compensated residual 118a of layer 102a has been determined, same may be predicted from the reconstructed base layer residual for the corresponding picture which residual is then further prosecuted in blocks 112a, 114a.

So far, the description of the mode of operation of the encoder of FIG. 1 concentrated on the treatment of the residual information by refinement coding means 114a,b. In particular, the residual information or texture information output by blocks 110a,b and encoded with a base layer precision in coding means 112a,b is refined in the refinement coding means 114a,b. However, refinement coding means 114a,b also enables a refinement or change of the motion information from layer to the next as well as a change in the frame/field decision made by blocks 118a,b.

The functionality of the encoder of FIG. 1 as described up to here fits well to cases of progressive video source material or in cases where the base layer coding means 112a,b uses frame_MBS_only_flag being equal to one, which means that the picture sequence representing the video consists of coded frames only, so that a decomposition of the frames into fields is neglected. However, the SNR and spatial scalability provided by the encoder of FIG. 1 in accordance with the functionality described so far is not ideal for interlaced source material. Due to this reason, the encoder of FIG. 1 operating in accordance with an embodiment of the present invention not only enables refinement of the texture information but also the motion information and, primarily, the frame/field decision, thereby forming a kind of extension to interlaced sources.

Figure 2:
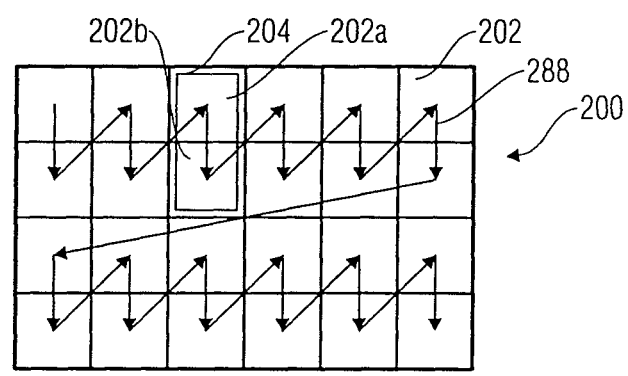
FIG. 2 a schematic illustrating the subdivision of a picture into macroblock pairs as well as a macroblock scan of a progressive refinement slice in case of a slice of a coded frame with macroblock-adaptive frame/field decision being activated.

However, before describing the different behavior of the encoder of FIG. 1, reference is made to the H.264/MPEG4-AVC standard in which several interlaced tools have been incorporated. In the first tool, a frame can either be coded as a coded frame or as two coded fields. This is referred to as picture-adaptive frame field coding. In other words, a frame or video may be considered to contain two interleaved fields, a top and a bottom field. The top field contains even-numbered rows 0, 2, . . . H/2-1, with H being the number of rows of the frame, wherein the bottom field contains the odd-numbered rows starting with the second line of the frame. If two fields of a frame are captured at different time instances, the frame may be referred to as an interlaced frame or it may otherwise be referred to as a progressive frame. The coding representation in H.264/MPEG4-AVC is primarily agnostic with respect to this video characteristic, i.e. the underlying interlaced or progressive timing of the original captured pictures. Instead, its coding specifies a representation primary based on geometric concepts, rather than being based on timing. The above-mentioned concept of picture-adaptive frame field coding is also extended to macroblock adaptive frame field coding. When a frame is coded as a single frame and the flag mb_adaptive_frame_field_flag, which is transmitted in the sequence parameter set is equal to 1, the scanning of macroblocks inside a slice is modified, as depicted in FIG. 2. FIG. 2 shows an exemplary portion of a picture 200. The picture is subdivided into macroblocks 202. Moreover, with a macroblock-adaptive frame/field coding being activated, each pair of vertically adjacent macroblocks 202 is grouped into a macroblock pair 204. As will become clearer from the following discussion, the subdivision of the picture 200 into macroblocks 202 rather serves as a provision of a quantum unity in which the encoder may decide about coding parameters that have to be adapted to the video content in the respective picture area in order to result in high coding efficiency. The macroblock pairs 204, in turn, subdivide the picture 200 spatially into a rectangular array of macroblock pairs 204. The two macroblocks 202*a* and 202*b* of one macroblock pair 204 spatially occupy either substantially the whole macroblock pair portion of the picture 200 with a vertical resolution being half the vertical resolution of picture 200, or divide the area of the macroblock pair 204 spatially into an upper half and a lower half. In any case, the macroblock containing the first, third, . . . lines or occupying the upper half is called the top macroblock 202*a*, whereas the other is called the bottom macroblock. In other words, two such vertical adjacent macroblocks are referred to as a macroblock pair which may also be arranged in a rectangular array as is shown in FIG. 2. For each macroblock pair, a syntax element mb_field_decoding_flag is transmitted or inferred. When mb_field_decoding_flag is equal to 0, the macroblock pair is coded as a frame macroblock pair with the top macroblock representing the top half of the macroblock pair and the bottom macroblock representing the bottom half of the macroblock pair in the geometrical sense. The motion-compensation prediction and transform coding for both the top and the bottom macroblock, is applied as for macroblocks of frames with mb_adaptive_frame_field_coding equal to 0 indicating that macroblock adaptive frame field coding is deactivated and merely frame macroblocks exist. When mb_field_decoding_flag is equal to 1, the macroblock pair represents a field macroblock pair with a top macroblock representing the top field lines of the macroblock pair and the bottom macroblock representing the bottom field lines of the macroblock pair. Thus, in this case, the top and the bottom macroblock substantially cover the same area of the picture, namely the macroblock pair area. However, in these macroblocks, the vertical resolution is twice the horizontal resolution. In the case of the latter field macroblock pairs, the motion compensation prediction and the transform coding is performed on a field basis. The coding of the picture content within the base and refinement layers is performed in slices, i.e. groups of macroblocks or macroblock pairs. One picture or frame may be composed of one or more slices. In FIG. 2, the macroblock pairs are assumed to belong to the same slice, and the arrows in FIG. 2 indicate an order in which the macroblocks are coded in the respective layers. As can be seen, the macroblocks are scanned pair-wise, with the top macroblock first followed by the respective bottom macroblock whereinafter the next macroblock pair is visited.

Macroblocks of coded fields or macroblocks with mb_field_decoding_flag equal to 1 of coded frames are referred to as field macroblocks. Since each transform block of a field macroblock represents an image area with a vertical resolution that is equal to twice the horizontal resolution, it is likely that the distribution of non-zero transform coefficient levels is shifted towards horizontal low frequencies and for a rate-distortion optimized coding, the scanning of transform coefficients inside a transform block is modified for field macroblocks relative to frame macroblocks.

Figure 3A:
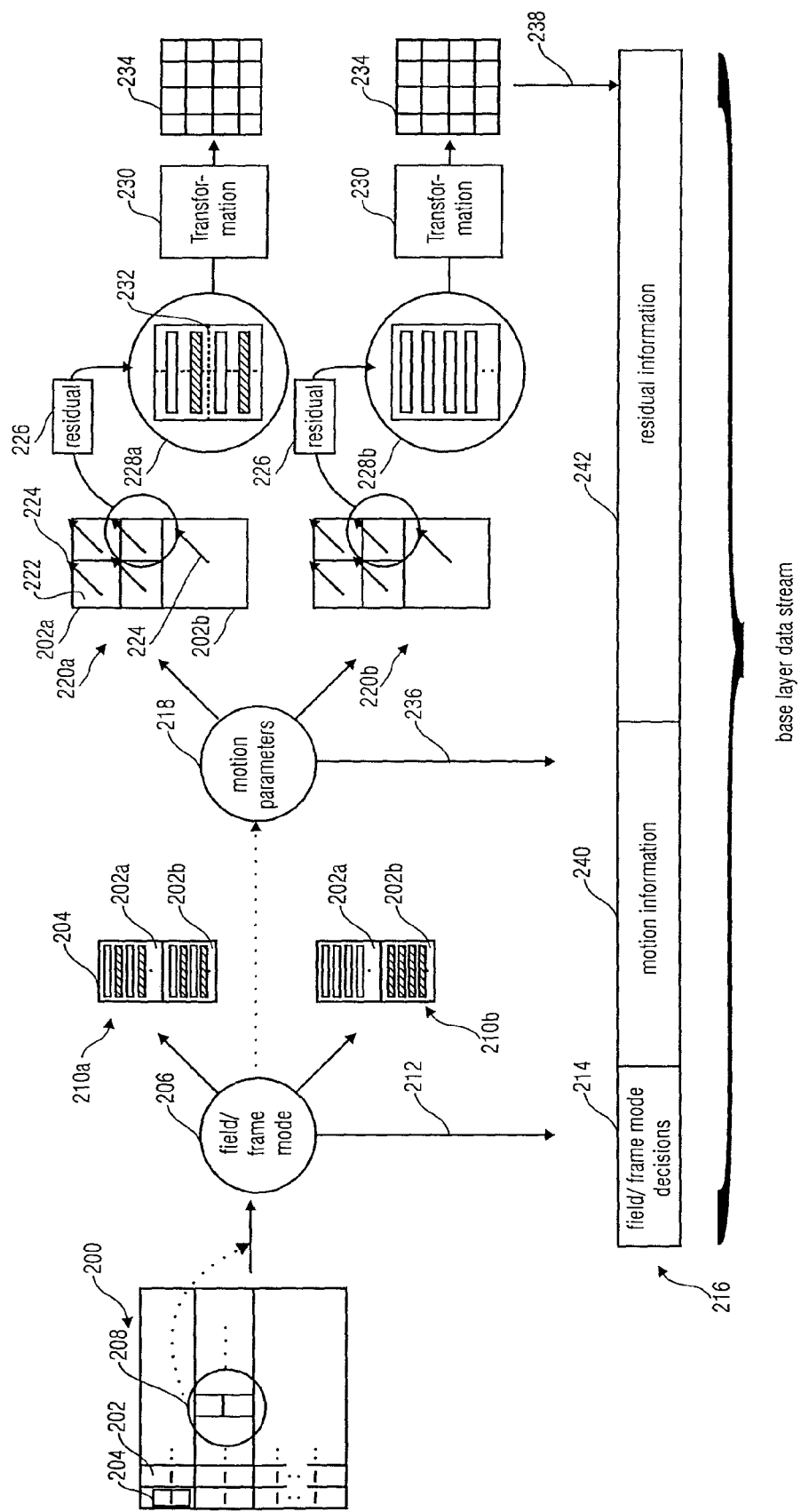
FIG. 3a a schematic block diagram illustrating the mode of operation of the encoder of FIG. 1 with respect to the creation of the base layer data stream.

The following description of the encoder of FIG. 1 focuses on the refinement of the motion information as well as the renewal of the frame/field decision performed for the respective macroblock pairs. However, before describing the refinement renewal of this data, reference is made to FIG. 3*a* showing schematically the steps performed by blocks 110*a,b* and 112*a,b* to obtain the base layer bit-stream 912*a,b*. Again, as a starting point, FIG. 3*a* shows a current picture 200 to be coded, the picture 200 being subdivided into macroblocks 202, the macroblocks 202 being grouped into macroblock pairs 204, so that the macroblock pairs 204 spatially subdivide the picture 200 into a rectangular array. In encoding the picture 200, block 110*a,b* decides, for each macroblock pair 204, as to whether the macroblocks of this macroblock pair shall be macroblocks of coded fields or macroblocks of coded frames. In other words, block 904*a,b* decides for each macroblock pair as to whether same shall be coded in the field or frame mode, this decision being indicated in FIG. 3*a* at 206. The macroblock pair-wise performance of the decision 206 is indicated by exemplarily highlighting one of the macroblock pairs 204 by encircling same with a circle 208. The consequence of the decision 206 is indicated at 210*a* and *b*. As can be seen, in case of frame-coded macroblocks 202*a* and 202*b* constituting a macroblock pair 204, same spatially subdivide the picture area occupied by the macroblock pair 204 into an upper half and a lower half. Therefore, both macroblock pairs 202*a* and 202*b* comprise the picture information contained in both odd-numbered and even-numbered lines of the picture, the odd-numbered lines being indicated by white rectangles, whereas the even-numbered lines are hatched. By contrast, in case of field mode, the top macroblock 202*a* merely comprises the picture information within the macroblock pair area as contained in the odd-numbered lines, i.e. the top field, whereas the bottom macroblock contains the picture information within the macroblock pair area contained in the even-numbered lines. This becomes clear by comparing 210a and 210b. The picture resolution in the vertical direction is reduced by a factor of 2 in the case of field mode. The frame/field mode decision 206 made by block 104a,b is somehow reflected in the base layer bit-stream 120a,b such that, at the decoder side, the decisions 206 may be extracted from the scalable bit-stream 126 and, especially, from the base layer data-stream in the scalable bit-stream 126, as it is indicated in FIG. 3a by arrow 212 pointing from decision 206 to a block 214 contained in the base layer data stream 216. As a precautionary measure only, it is noted that the frame/field mode decisions do not necessarily need to be arranged or encoded into a continuous block within the base layer data stream 216. The decision with respect to the respective macroblock pairs 204 may be distributed over the base layer data stream 216 in a parsable way. For more details, reference is made to the H.264/MPEG-AVC standard.

However, the frame/field mode decisions 206 are not the only decisions to be made by blocks 110a,b. Rather, as indicted by 218, blocks 110a,b also determine the motion parameters for each macroblock. These motion parameters define, for example, at which spatial resolution motion vectors are determined for a respective macroblock. As it is shown in FIG. 3a at 220a for example, the top macroblock 202a has been further subdivided into four partitions 222, wherein for each partition 222 a motion vector 224 is defined. Compared thereto, the bottom macroblock 202b is left as one partition, so that merely one motion vector 224 has been determined for this macroblock. Of course, the decision 218 with respect to the motion parameters is, in the rate/distortion optimization sense, not independent of the frame/field decision 206. This is indicated by 220b indicating an exemplary partitioning for the macroblocks 202a and 202b in case of field-coded macroblocks, whereas the earlier described case of 220a shall reflect the case of frame-coded macroblocks. Although the partitioning is exemplarily shown to be the same, it is clear that the partitioning may be different depending on the frame/field decision 206. A further motion parameter may define the number of reference pictures used for motion-compensatedly predicting the respective macroblock. This decision may be made on a partition basis, macroblock basis or picture basis as well as a slice basis. However, for simplifying FIG. 3a, just one motion vector is shown for each partition 222. Beside this, the motion parameters 218 of course define the motion vectors themselves, such as the direction and length thereof. The motion vectors define the displacement of the reconstructed reference picture having to be performed before taking the picture content of the reconstructed reference picture as a prediction for the picture information contained in macroblock 202a,b. In determining 226 the residual or prediction error, the picture content taken from the reconstructed reference picture displaced as defined by the motion vectors 224 is of course different when considering field-coded macroblocks and frame-coded macroblocks. In case of frame-coded macroblocks, the picture information used out of the displaced and reconstructed reference picture represent a continuous spatial sub-area. However, in case of a field-coded macroblock, the picture information used out of the displaced and reconstructed reference picture relates to an area twice as high. The residual thus obtained for a specific partition 222 is indicated at 228 for a frame-coded macroblock and at 222b for a field-coded macroblock. The residual samples contained in this partition 228a,b are not directly coded into the base layer bit-stream. Rather, a transformation, such as a DCT or some other spectral decomposition, is performed on the residual samples in order to obtain a transformation coefficient matrix for representing the residual information contained in 228a,b. The transformation 230 may be performed on the whole partition or macroblock 202a,b. However, the transformation 230 may also be performed on sub-portions of the macroblock 202a,b or the partition 228a,b, as exemplarily indicated by dashed lines 232 in partition 228a. Accordingly, one or more transformation coefficient matrices 234 may be obtained from one macroblock or partition.

The motion parameters 218 as well as the transformation coefficients in matrices 234—the latter in relatively coarsely quantized form as already mentioned above—are incorporated by base layer coding means 112a,b into the base layer data stream 216 or 120a,b, as shown by arrows 236 and 238, thereby obtaining motion information 240 and residual information 242 in base layer data stream 120a,b.

A Lagrangian approach may be used for determining the frame/field mode decisions and the motion parameters 218 such that the rate/distortion ratio is somehow optimized.

Although the decisions 206 and 218 may in the rate/distortion sense be optimal for the quality associated with the base layer data stream, different decisions 206 and 218 may be optimal when considering a higher quality. This consideration results in the mode of operation of encoder of FIG. 1 in accordance with an embodiment of the present application, according to which the frame/field mode decision 206 does not necessarily have to be maintained by the encoder. Rather, encoder and decoder are enabled to change the frame/field mode decision with respect to individual macroblock pairs in the refinement layers. In accordance with the embodiment of FIG. 1, a change of the frame/field mode decision is accompanied by a renewal of the motion parameters and the residual transform coefficients, too. However, as will be described afterwards, this does not necessarily have to be the case.

FIG. 3b schematically shows the mode of operation of the refinement coding means 114a,b in accordance with an embodiment of the present invention. FIG. 3b focuses on the refinement of one exemplary macroblock pair 204, which is exemplarily composed of two frame-coded macroblocks 202a and 202b, with a top macroblock 202a being partitioned into four partitions 222, whereas the bottom macroblock 202b is composed of merely one partition. The field/frame mode decision and the motion parameters thus defined for the representative macroblock pair 204 correspond to the ones shown at 220a in FIG. 3a. As has also already been described with respect to FIG. 3a, the residual information with respect to the macroblock pair 204 is transmitted by use of transform coefficients arranged in a transform coefficient matrix 234. The transform coefficients in the transform coefficient matrix 234 correspond to different frequencies in horizontal direction 244 and vertical direction 246. In FIG. 3b, the upper left transform coefficient, for example, corresponds to the DC component, this transform coefficient being indicated by 248a.

Now, considering the refinement or quality or precision enhancement for the macroblock pair 204, refinement coding means 114a,b makes 250 a decision as to whether to keep or to change the frame/field mode decision relative to the decision made by block 110a,b with respect to the base layer.

Firstly, the case of keeping the frame/field mode decision is considered. In this case, the macroblock pair 204 is still treated as frame-coded in the refinement layer. However, refinement coding means 114a,b considers whether it is in rate-distortion sense better to keep the motion information, i.e. to adopt the motion information from the subordinate layer, i.e. the base layer, and just refine the residual information, or whether it is better to change the motion information and residual information compared to the base layer. This decision is indicated by 252 in FIG. 3b. If refinement coding means 114a,b decides, for a specific macroblock pair 204, to keep both the frame/field mode decision and the motion information, refinement coding means 114a,b incorporates the results of the decisions 250 and 252 into the first enhancement layer data stream 122a,b. The result of decision 250 is incorporated into data stream 122a,b in form of mode change indicators 256, as indicated by the dashed line 258. Accordingly, the result of decision 252 is incorporated into data stream 122a,b as a motion precision-enhancement on/off indicator 260, as indicted by a dashed line 262. Moreover, refinement coding means 114a,b incorporates into the data stream 122a,b residual precision enhancement information 266, this incorporation being indicated with dashed arrow 263. In the current embodiment, the residual precision enhancement information 266 incorporated at 263 shall represent residual transform coefficient levels representing a residual of the respective transform coefficient levels as defined so far by the subordinate layer, i.e. subordinate refinement layer or base layer, relative to the real transform coefficients at a reduced quantization step size, such as divided by two relative to the subordinate layer. However, as indicated below, a further flag/indicator within stream 122a,b may be used to indicate that, for a specific macroblock, the residual precision enhancement information 266 is to be interpreted at decoder side as anew transform coefficient levels representing the transform coefficient levels independent of the current transform coefficient levels as derivable up to the subordinate layer.

The refinement coding means 114a,b may decide not to keep the motion information for a specific macroblock but to refine same relative to the base layer. In this case, the refinement coding means 114a,b indicates the result of this alternative decision 252 by a respective indicator 260 in the first enhancement layer data stream 122a,b. Moreover, refinement coding means 114a,b incorporates into the data stream 122a,b motion precision enhancement information 264 as well as residual precision enhancement information 266, as it is indicated by dashed arrows 268 and 270. The motion precision enhancement information 264 and/or the residual precision enhancement information 266 may either represent completely new motion information/residual information or refinement information for refining the motion information and residual information of the subordinate layer, respectively, i.e. the base layer in the case illustrated in FIG. 3b. Completely new enhancement information 264 or 266 shall indicate—as already indicated above with respect to the residual data—enhancement information that completely replaces the respective enhancement information of the subordinate enhancement layer, i.e. the base layer. Contrary thereto, enhancement information 264 and 266 is for refining the motion/residual information of the subordinate layer, the motion/residual information of the current refinement layer, i.e. the first enhancement layer in case of FIG. 3b, being derivable merely by combining both the current enhancement information 264, 266 as well as the motion/residual information of the subordinate layer, such as by adding corresponding transform coefficient levels or motion vector component levels of the two consecutive refinement levels.

To illustrate the effect of changing the motion information in the first enhancement layer, the effect of keeping the frame/field mode decision but changing the motion information is indicated in FIG. 3b at 272. As shown there, the motion information associated with macroblock pair 204 in the first enhancement layer differs from the motion information associated with that macroblock pair 204 in the base layer in that two reference pictures are used for predicting the picture content within the macroblock pair. Accordingly, each partition 222 is associated with two motion vectors 224a and 224b. Moreover, the motion information of the first refinement layer changes the partitioning of the bottom macroblock 202b in that same is partitioned into four partitions instead of forming merely one partition, as it is the case in the base layer. The motion information of the first refinement layer, i.e. the reference picture numbers, the motion vectors 224a and 224b as well as the partitionings of macroblocks 202a and 202b may be either coded completely new in the first enhancement layer data stream 122a,b or with taking the motion information of the base layer as a predictor. For example, if the motion vectors 224a correspond to the same reference picture, merely the offset of the motion vectors 224a relative to the motion vectors 224 of the base layer may be coded into motion-precision enhancement information 264. By assuming a temporarily linear motion, the motion vectors 224 may also serve as the basis for a prediction of the new motion vectors 224b relating to a different reference picture. Beside this, the single motion vector 224 of the single partition of the bottom macroblock 202b may serve as a predictor for the motion vectors of each partition of the bottom macroblock 202b in the first enhancement layer.

Similarly, the transform coefficient levels for the transform coefficients of the transform coefficient matrix 234 transmitted in the first enhancement layer data stream 122a,b may either represent merely residuals or offsets relative to the transform coefficient levels of the base layer quantized with a finer quantization step size, or represent a transform coefficient of the transform coefficient matrix 234 completely anew without use of the transform coefficients of the base layer as a prediction.

Up to now, the case has been described in which the refinement coding means 114a,b decides to maintain the frame/field mode decision with respect to macroblock pair 204. However, if the result of decision 250 is to change the frame/field mode in the first enhancement layer, this is indicated by a respective mode change indicator 256, and new motion information along with new residual information is inserted in form of motion precision enhancement information 264 and residual precision enhancement information 266 into the first enhancement layer data stream 122a,b, as it is indicated by dashed arrows 274 and 276. In particular, according to the example of FIG. 3b, the motion information of macroblock pair 204 is changed from the base layer to the first enhancement layer such that new motion vectors 224 for the partitions 222 of the top macroblock 202a are defined, and the bottom macroblock 202b is partitioned into four partitions 222 with one motion vector 224 for each partition 222. As is indicated at 278, the macroblocks 202a and 202b are now field-coded with the top macroblock 202a, for example, merely including odd-numbered lines. The residual information is coded by means of transform coefficient levels of transform coefficients in respective transform coefficient matrixes 234 with the levels being coded without using the transform coefficient levels of the matrices 234 of the base layer as a prediction.

However, although in accordance with the present embodiment the motion and residual information is coded completely new in the case of not keeping the frame/field mode decision, alternatively, the motion information and residual information of the base layer defined for different frame/field modes may be used as a predictor. Consider, for example, the transform coefficients. The vertical resolution of the residual samples in the base layer is twice the vertical resolution of the residual samples of the first enhancement layer. Due to this, the highest-frequency component in the vertical direction 246 for which matrix 234 of the base layer comprises transform coefficients is twice the highest-frequency component in the vertical direction 246 for which matrix 234 of the first enhancement layer comprises transform coefficients. Thus, at least a part of the matrices 234 of the base layer may be used as a predictor for the transform coefficients of the matrices 234 of the first enhancement layer. To be more precise, the transform coefficient level of the transform coefficient 248a representing the DC component and transmitted 276 within the residual precision enhancement information 266 in the first enhancement layer data stream 122a,b may represent an offset relative to the transform coefficient level for the corresponding transform coefficient 248a transmitted in the base layer data stream 120a,b. The same applies for the higher-frequency horizontal components. Moreover, the transform coefficient levels of the first enhancement layer transmitted for the next but one higher vertical frequency component 280 may be coded as prediction errors relative to the next vertical frequency components in the base layer indicated by 282. Similarly, the motion vectors of the frame-coded macroblocks of the base layer may be used as predictors for the motion vectors of the first enhancement layer.

Of course, the above example of changing the frame-coded macroblock pair from the base layer to a field-coded macroblock pair in the first enhancement layer was just a possible example. Of course, a field-coded macroblock pair in the base layer may be changed into a frame-coded macroblock pair in the first enhancement layer. Moreover, it is possible that no change in the frame/field mode decision with respect to a specific macroblock pair occurs in the first enhancement layer but in the second or following enhancement layer. The quality or precision of the pictures of the video may be increased and the distortion of the picture decreased from one layer to the next by, for example, decreasing the quantization step size for transmitting the transform coefficient levels, increasing the resolution by which the motion vectors are defined and/or using a finer partitioning and a greater number of reference pictures for the motion compensation. Moreover, apart from the indicators 256 and 260, other indicators may also be transmitted within the first enhancement layer data stream 122a,b. For example, indicators may be transmitted within first enhancement layer data stream 122a,b in order to indicate as to whether merely the motion information or the residual information or both are replaced or refined by the first enhancement layer data stream 122a,b with respect to a specific macroblock. Similarly, index indicators may be used in order to define as to whether motion precision enhancement information or residual precision enhancement information with respect to a specific macroblock is to replace or refine the respective motion/residual information of the subordinate layer.

It may be noted that, in accordance with an embodiment of the present invention, the order in which the transform coefficient levels of the first enhancement layer are inserted in the current enhancement layer data stream 122a,b is dependent on the result of decision 250. For example, if, in accordance with a current enhancement layer, a specific macroblock is a frame-coded macroblock, a scan path 284 used for defining the order in which the transform coefficient levels of the first enhancement layer are inserted into the residual precision enhancement information 266 is different from a scan path 286 used for the transform coefficient levels of the respective field-coded macroblock in the subordinate enhancement layer. The difference in the scan paths for field- and frame-coded macroblocks reflects the existence of higher-frequency vertical components in the transform coefficient matrixes 234 of frame-coded macroblocks relative to field-coded macroblocks. In particular, advantageously the transform coefficients are transmitted within the residual precision enhancement information 266 with first transmitting the transform coefficient levels of the non-significant transform coefficients, i.e. those transform coefficients for which the transform coefficient level is 0 according to the subordinate layer. The transform coefficient levels of the non-significant transform coefficients are coded in a so-called significant path. The coding of the transform coefficient levels of significant transform coefficients following thereto is called a refinement path. The significance path is performed in several cycles. In the first cycle, for example, the first non-significant transform coefficient along the scan path 284 or 286 in the first transform block (see 232 in FIG. 3a) in the first macroblock is coded. Eventually, further transform coefficient levels of following non-significant transform coefficients in scan path direction 284 and 286 within the current transform block are coded immediately thereafter, depending on the transformation block size. Then, the next transform block in a transform block scan order within the current macroblock is visited until all transform blocks within the current macroblock have been visited.

Thereafter, the next macroblock in macroblock scan order within the current slice is visited, wherein the procedure is performed again within this macroblock, the macroblock scan order being indicated in FIG. 2 by 288. Further cycles are performed after having visited the last transform block in the last macroblock of the current slice. After having coded the transform coefficient levels of the non-significant transform coefficients, the transform coefficient levels of the significant transform coefficients are coded in the refinement path. The refinement path may, depending on the encoding scheme used for coding the syntax elements into the bit-stream 126, for example, variable length coding or arithmetic coding performed by scanning the macroblocks within a slice merely once or by scanning them in a fixed number of cycles each cycle being dedicated for a specific transform coefficient position in scan order 284 or 286, with a respective transform coefficient level for a specific transform coefficient position merely being coded if the transform coefficient is significant.

In the significance path as well as the refinement path, the scan path used for determining the visiting order among the transform coefficients within the respective transform block depends on the frame/field mode of the corresponding macroblock pair according to the current refinement layer. That is, the ordering of the transform coefficients in the first enhancement layer data stream 122a,b may have an impact on the rate/distortion ratio of the resulting first enhancement layer data stream 122a,b since, if a context-adaptive coding scheme is used, an ordering of the transform coefficient levels in the first enhancement layer such that transform coefficient levels having a similar probability distribution are arranged in a juxtaposed position within the first enhancement layer data stream 122a,b may enable a better adaptation of the probability estimation used for encoding. Therefore, the decisions 250 and 252 may also depend on the influence of these decisions to the coding efficiency or quality of the probability estimation used for encoding the syntax elements and, in particular, the transform coefficient levels in the first enhancement layer.

The way, refinement coding means 114a,b makes decisions 250 and 252 may be similar to the way by which blocks 110a,b along with base layer coding blocks 112a,b create the base layer bit-stream 120a,b. To be more precise, a Lagrangian approach may be used in order to optimize the decisions in rate/distortion sense.

After having described the functionality of the refinement coding means 114a,b with respect to FIG. 3b, the mode of operation of the encoder of FIG. 1 is described again with respect to FIG. 1 to FIG. 3b with more specific reference to the H.264/MPEG4-AVC standard. In other words, the functionality of the encoder of FIG. 1 is described more precisely in the context of creating a scalable bit-stream 126 as a scalable extension of the H.264/MPEG4-AVC standard. In the above-described SVC working drafts of October 2005, the scalability tools were especially dedicated for frame_MB-S_only_flag equal to 1. In other words, in accordance with these drafts the macroblocks were frame macroblocks only. The concepts of supporting SNR and spatial scalability have only been designed for progressive source material. However, the encoder of FIG. 1 forms an extension to interlaced sources by considering the properties of interlaced source material. In particular, the encoder of FIG. 1 optimizes the coding of progressive refinement slices with adaptive motion refinement as described in the above working draft JVT-Q031 for interlaced source material. In addition to the motion and residual refinement, a revision of the macroblock-based frame/field decision of the base quality layer can be transmitted in an FGS enhancement layer.

In particular, the encoder of FIG. 1 extends the coding of progressive refinement slices with adaptive motion refinement for interlaced frames with macroblock-adaptive frame/field decisions in that, when macroblock-adaptive frame/field coding is enabled, then, for all macroblock pairs or a subset of the macroblock pairs of a progressive refinement slice of a coded frame, a syntax element is transmitted that signals whether the macroblock pairs are coded as a pair or field or frame macroblocks. Depending on the frame/field mode of the macroblock pair and the progressive refinement slice and the frame/field mode of the co-located macroblock pair in the subordinate SNR layer, the following applies: (1) If the current macroblock 202a (FIG. 3b) is coded in the field-frame mode and the co-located macroblock pair in the subordinate SNR layer (in FIG. 3b, the base layer) is coded in the same field-frame mode (see yes path starting from decision 250 in FIG. 3b), the field-frame decision of the SNR subordinate layer macroblock pair is used. The motion and prediction information can be refined independently of the field/frame decision as transmitted by additional indicators or syntax elements 262, 268 and 270, wherein reference is made to PCT EP 2005/010972 for further details in this regard, the content of which is incorporated herein by reference with respect to the refinement of the motion information and refinement information in case of keeping the frame/field mode decision unchanged. (2) Otherwise, if the field/frame decision in the current slice is different from the field/frame decision in the subordinate SNR layer (see yes branch from 250), for both macroblocks in the macroblock pair, a new macroblock mode (260) together with corresponding motion and prediction information (264) is transmitted in addition to the refinement (266) of the residual signal. The possible macroblock modes are the same as supported by the coding standard H.264/MPEG4-AVC, which means that by subdivision of the macroblock into smaller blocks or partitions for motion-compensated prediction up to 16 motion vectors for P-slices and up to 32 motion vectors for B-slices can be signalled.

One way to make this frame/field decision in a progressive refinement slice is to use a Lagrangian approach where a Lagrangian cost functional $J=D+\lambda R$ is minimized for a given $\lambda$. Here, D stands for the distortion between original and reconstructed (decoded) signal and R represents the bit rate needed for coding the macroblock pair. If the cost for reversing the frame/field decision of the subordinate SNR layer is lower than the cost for keeping the frame/decision of the subordinate SNR layer, it is in rate-distortion sense obviously better to reverse the frame/field decision of the macroblock pair and transmit a new set of motion and/or prediction information (see no-path of decision 250). Consequently, using the adaptive frame/field refinement it is possible to achieve a higher picture quality at the same bit rate.

An advantage of the FGS coding scheme presented here with respect to FIGS. 1 and 3b is that the inverse transform at the decoder side has to be performed only once for each transform block. The scaled transform coefficients of the base quality layer and of all associated progressive refinement slices are, as far as macroblock pairs with maintained frame/field coding mode are concerned, added up, and merely the obtained transform coefficients, which represent the highest available quality, have to be transformed. This concept is, in accordance with the FGS coding scheme of FIGS. 1 and 3b, also followed with respect to the adaptive motion refinement. In order to not increase the decoder complexity for the FGS coding scheme with adaptive frame/field decisions, advantageously a special restriction is introduced for the case that the frame/field decision of the subordinate SNR layer is changed. When a new macroblock mode is transmitted in the FGS coding scheme with adaptive motion refinement at a certain refinement layer, a further syntax element residual_prediction_flag signals whether the residual signal of the SNR base layer (or the subordinate refinement layer) is used for reconstruction. If this flag is equal to 1, the transform coefficients that have been transmitted in the SNR base layer are used for reconstructing the residual of the enhancement layer representation. Otherwise, if this flag is equal to 0, the residual signal of the enhancement layer representation is reconstructed by using only the transform coefficient levels 266 that are transmitted in the FGS enhancement layer 122a,b. Since the transforms that are performed for field macroblock pairs use different sets of samples than the transforms that are performed for frame macroblock pairs, it is advantageous to avoid multiple transforms by forbidding the residual prediction when a frame/field decision is changed. Thus, in an embodiment of the present invention, the syntax element that specifies the above-described usage of a residual from the SNR base layer, i.e. the syntax element residual_prediction_flag, is only transmitted when the frame/field decision of the SNR base layer is not modified in the SNR enhancement layer. Otherwise, the syntax element residual_prediction_flag is inferred to be equal to 0 at the decoder side.

According to an embodiment of the present invention, the syntax of specifying the frame/field decision and the macroblock mode for the FGS enhancement layer can be expressed by the following pseudo-code. In so far, the following code defines the steps performed by blocks 114a,b to code the syntax elements mentioned above into the refinement layer data stream 122a,b.

```
(10)      ...
(12)      if( ! field_pic_flag  &&  mb_adaptive_frame_field_flag ) {
(14)          ...
(16)          mb_field_decoding_flag_EL            // frame/field decision in
(18)                                               // enhancement layer
```

```
(20)            if(mb_field_decoding_flag_EL == mb_field_decoding_flag) {
(22)                // frame/field decision of is not modified
(24)                    // top macroblock
(26)                    change_top_pred_info_flag        // modified
(28)                                                     // motion/prediction
(30)                    if(change_top_pred_info_flag )  {
(32)                        transmission of macroblock mode, motion and
(34)                        prediction data
(36)                        transmission of residual_prediction_flag
(38)                    }
(40)                    start transmission of transform coefficient
(42)                    levels for the top macroblock
(44)                    // bottom macroblock
(46)                    change_bot_pred_info_flag        // modified
(48)                                                     // motion/predicton
(50)                    if( change_bot_pred_info_flag )  {
(52)                        transmission of macroblock mode, motion and
(54)                        prediction data
(56)                        transmission of residual_prediction_flag
(58)                    }
(60)                    start transmission of transform coefficient
(62)                    levels for the bottom macroblock
(64)            } else {
(66)                    // frame/field decision is modified
(68)                    // top macroblock
(70)                    transmission of macroblock mode, motion and
(72)                    prediction data
(74)                    residual_prediction_flag is inferred to be equal
(76)                    to 0
(78)                    // bottom macroblock
(80)                    transmission of macroblock mode, motion and
(82)                    prediction data
(84)                    residual_prediction_flag is inferred to be equal
(86)                    to 0
(88)                    // coding of transform coefficients
(90)                    start transmission of transform coefficient
(92)                    levels for the macroblock pair
(94)            }
(96)            ...
(98)    }
```

The first if-clause (line 12) checks as to whether the video source material has been coded by the base layer coding blocks 112*a,b* such that a macroblock-adaptive frame/field decision is activated. If this is the case a syntax element mb_field_decoding_flag_EL is transmitted in the enhancement layer for a current macroblock pair or several macroblock pairs (line 16) in order to define its frame/field decision in that enhancement layer. The second if-clause (line 20) checks as to whether the frame/field decision has changed in the enhancement layer relative to the base layer where the frame/field decision is coded into mb_field_decoding_flag.

The next lines (lines 22-62) define the information transmitted when the frame/field decision has not been modified. In this case, firstly, a syntax element change_top_pred_info_flag is transmitted and coded (line 26) indicating as to whether the motion/prediction information for the current top macroblock is modified relative to the subordinate layer. This syntax element therefore represents an indicator 260 as shown in FIG. 3*b*. If this is the case (third if-clause in line 30), a new macroblock mode, new motion vectors and reference picture numbers are transmitted (lines 32 and 34). Then, a transmission (line 36) of syntax element residual_prediction_flag is performed for signalling as to whether the transform coefficient levels for the current top macroblock to follow are transmitted as self-contained new transform coefficients or refinement information for refining the current coarser quantized transform coefficients. Then, i.e. if the motion information is indicated to be adopted from the subordinate layer (no path of if clause at line 30) or the new motion information along with the residual_prediction_flag has been transmitted (lines 32-36), the transmission of the transform coefficient levels is performed (lines 40, 42) with the transform coefficient levels representing, in the case of change_top_pred_info_flag being set, new transform coefficient level information or differentially coded or residual transform coefficient levels, depending on residual_prediction_flag transferred in line 36. In the other case, i.e. change_top_pred_info_flag not being set, the transform coefficient levels represent residual transform coefficient levels, i.e. residual_prediction_flag is inferred to indicate differential coding. This is repeated for the bottom macroblock (lines 44-60).

In other words, in accordance with the present embodiment, in case of the frame/field decision being not modified, in any case, a "refinement" of the residual information takes place. Of course, this refinement may be zero, or "refinement" may mean that the bit-stream transmitted so far is not used but that a complete anew signal is transmitted that is not differentially coded. The first flag, i.e. change_top/bot_pred_info_flag, indicates as to whether the refinement of the residual is conducted in the "normal mode", i.e. the same motion parameters are used as in the subordinate layer, und the refinement of the residual is coded as a difference to the transform coefficients transmitted so far in the base layer and subordinate refinement layers if any. In case change_top/bot_pred_info_flag is not set, new motion parameters are transmitted—in the present case without differential coding but the latter is also possible as indicated above—, and a further flag is transmitted, i.e. residual_prediction_flag, this flag indicating as to whether the residual being valid so far is used. If the latter flag is set, then the refinement is coded as a difference/residual/refinement, otherwise the residual signal is coded completely anew.

However, otherwise, if the frame/field decision has been modified relative to the base layer, new macroblock partitioning mode, motion vectors and reference picture numbers are transmitted (lines 70, 72) for the current top macroblock without signalling syntax element residual_prediction_flag which is, instead, at the decoder side, to be inferred to be equal to 0 (lines 74, 76). This is repeated for the bottom macroblock (lines 78-86). The transmission of the transform coefficient levels for the current macroblock pair then starts (lines 90 and 92) after having transmitted the motion information for the top and bottom macroblocks for the whole macroblock pair. Of course, the steps 10-92 are performed for further macroblock pairs as well.

With respect to the above pseudo-code embodiment, it is emphasized that the modified syntax only applies when a coded frame is transmitted, i.e. field_pic_flag is equal to 0, and macroblock-adaptive frame/field coding is enabled, i.e. mb_adaptive_frame_field_flag is equal to 1 (line 12). Further, the frame/field decision is only transmitted (lines 16, 18) when the macroblock pair is visited the first time during the coding of progressive refinement slice. When the syntax element is different from the corresponding syntax element of the base SNR layer, a new set of macroblock modes, motion and/or prediction information are transmitted (lines 70, 72, 80, 82) for both macroblocks of the macroblock pair, and the residual_prediction_flag is inferred to be equal to 0 for both macroblocks of the macroblock pair (lines 74, 76, 84, 86). Additionally, a syntax element specifying the transform size could be transmitted. The coding proceeds with a first transform coefficient level of the top macroblock in the significance path described above (lines 90, 92). When the value of the syntax element specifying the frame/field decision is identical to its value in the base quality slice, the FGS coding follows the concept in the above-reference PCT application or the concept of JVT-Q031. The coding proceeds with the top macroblock, and here first a syntax element, which specifies a change of the macroblock mode and associated motion and prediction data, change_top_pred_info_flag is transmitted (line 26). If this syntax element is equal to 1, a new macroblock mode and associated motion and prediction data as well as a flag specifying the usage of residual prediction from the base layer are transmitted (lines 32-36). The coding then proceeds with the first transform coefficient level of the top macroblock in the significance path (lines 40, 42).

In all following visits of a macroblock pair or macroblock, i.e. when mb_field_decoding_flag_EL and change_top_pred_info_flag or change_bot_pred_info_flag (when applicable) and the corresponding syntax elements specifying a modified macroblock prediction modes have already been transmitted, only further transform coefficient levels are coded in the order mentioned above. That means, the syntax element mb_field_decoding_flag_EL (and a possible modification of the macroblock prediction information for the corresponding macroblock pair) is only transmitted when a macroblock pair is visited the first time and no transform coefficient level for this macroblock pair has been transmitted in the current progressive refinement slice. Similarly, the syntax element change_top_pred_info_flag or change_bot_pred_info_flag as well as a possible modification of the macroblock prediction information is only transmitted when mb_field_decoding_flag_EL is equal to mb_field_decoding_flag of the co-located macroblock pair in the SNR base layer, and when the macroblock is visited the first time and no transform coefficient level has been transmitted for this macroblock.

Figure 4:
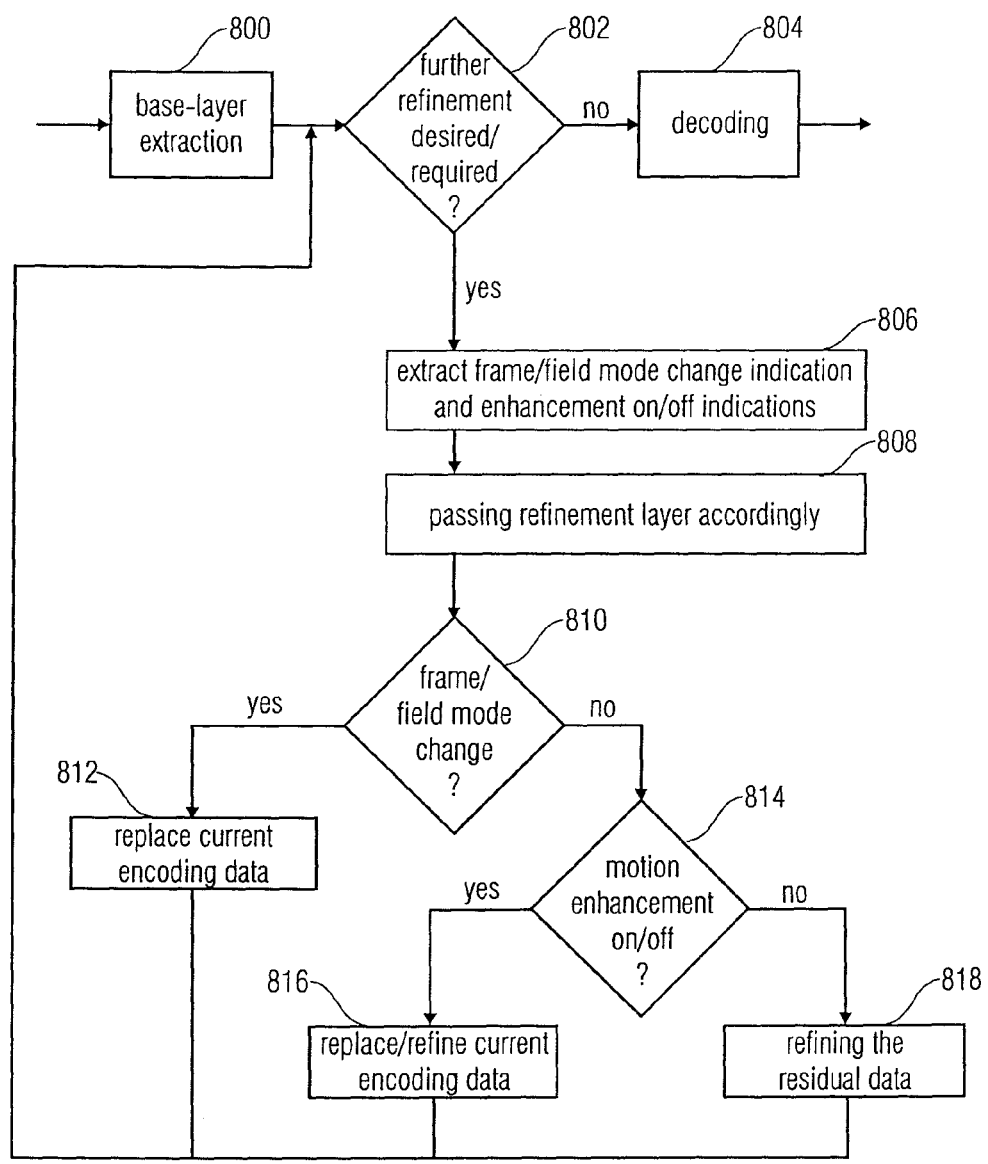
FIG. 4 a flow chart showing the steps performed at decoder side in accordance with an embodiment of the present invention.

With respect to FIG. 4, the steps to be performed by a decoder for decoding the scalable bit-stream 126 are described. The decoder starts with parsing the base layer bit-stream 122a and 122b contained in the scalable bit-stream 126 in step 800. As a result of step 800, the decoder knows the field/frame mode for each macroblock pair as well as the motion parameters for each macroblock as well as the existence of the residual information. In other words, in step 800, the decoder extracts the information 214, 240 and 242 from the base layer data stream 122a,b. In the next step, step 802, the decoder checks as to whether further refinement or quality enhancement is desired/necessitated. If not, the decoder immediately decodes the base layer data stream 122a,b in a decoding step 804. Depending on the spatial resolution desired/necessitated, the decoding 804 is performed by merely decoding the base layer bit-stream 120b in accordance with the H.264/MPEG4-AVC standard or both base layer bit-streams 120a,b are decoded in accordance with that standard and then the coarsely reconstructed pictures are refined by the finely reconstructed ones.

If a further refinement is desired/necessitated, the decoder steps to step 806 in which the frame/field mode change indication (mb_field_decoding_flag) and, if no change is indicated, the motion enhancement on/off indication (change_*_pred_into_flag) is extracted from the next higher-order refinement layer bit-stream 122a,b. Upon step 806, the decoder is able to reconstruct from the frame/field mode of the macroblock pairs in the current refinement layer and the significance of the transform coefficient levels in the base layer or subordinate layer, the significance path and the refinement path used at the encoder side for the current refinement layer. In the next step, step 808, decoder parses the refinement layer accordingly in order to extract the motion information for all macroblocks with motion enhancement on/off indication indicating a replacement of the current motion information and for all macroblocks with changed frame/field mode decision, as well as the residual information representing differentially coded residual information or self-contained residual information depending on residual_prediction_flag being parsed from the refinement data stream in case of change_*_pred_into_flag being set, and inferred to indicate differential coding in case of change_*_pred_into_flag being not set. Next, in step 810, the decoder checks for each macroblock pair as to whether the frame/field mode has changed relative to the subordinate layer. If yes, the decoder steps to step 812 and replaces, since the residual_prediction_flag is inferred to be equal to 0, the current encoding data, i.e. the current motion/residual data, with the motion/refinement information 264 and 266 extracted from the enhancement layer data stream of the current enhancement layer. However, for all macroblock pairs where the frame/field mode has not been modified, the decoder checks the motion enhancement on/off indicator, i.e. the syntax element change_bot_pred_info_flag, as to whether motion enhancement information 264 or 266 exists for the respective macroblocks of the macroblock pair. If this is the case, the decoder replaces—in an alternative embodiment refines—the current motion data for this macroblock, i.e. the motion information, and replaces or refines the residual data for this macroblock depending on the respective flag transmitted in the incoming data stream, i.e. residual_prediction_flag. To be more precise, in the case of decoding the enhancement layer data stream in accordance with the above-pseudo code, the motion information is replaced, whereas, in case of the frame/field decision being not modified, the residual information is replaced or refined depending on some indicator, namely residual_prediction_flag in the case of the above pseudo-code enhancement layer data stream. In case of replacement, the motion information for a specific macroblock contained in the enhancement layer completely replaces the motion information of the subordinate layer. In case of refinement, the information of the subordinate layer is combined with the respective information in the enhancement layer. Especially, the transform coefficient levels of the enhancement layer are dequantized and added to the already having been dequantized or scaled (and eventually summed up) transform coefficient levels of the corresponding transform coefficients of the subordinate layer.

Otherwise, i.e. if the motion enhancement on/off indicator shows that the enhancement layer has no motion enhancement information for the respective macroblock, nothing is changed with respect to the motion data for this macroblock but the decoder refines, in step 818, the residual data by means of combining the current transform coefficients gained from the incoming data stream so far and—via de-quantization—the refinement information of the current refinement layer for refining the residual data, i.e. the transform coefficient levels defined for a reduced quantization step size.

Thereafter, i.e. after having performed any of steps 812, 816, and 818 for all macroblocks of the current picture, the procedure returns to step 802 in order to check as to whether further refinement is desired/necessitated. If yes, steps 806 to 818 are performed again for the next refinement layer. Otherwise, the procedure steps forward to step 804, where the current encoding data is decoded, i.e. the re-transformation, such as an inverse spectral decomposition, is performed, the picture content of the macroblocks is predicted by use of the current motion information and based on already reconstructed reference pictures and the residual information obtained by the re-transformations combined with the prediction thus obtained in order to yield the current picture in its reconstructed form.

Summarizing the above embodiments, they represent an FGS coding scheme with the following properties. Firstly, the coding of refinement signals for frames with macroblock-adaptive frame/field decision in which a pair of vertical adjacent macroblocks is either coded as a pair of frame or a pair of field macroblocks, is supported. Further, the frame/field decision for macroblock pairs of the base SNR layer is allowed to be adaptively modified in the FGS enhancement layer. It is possible that the frame/field decision for an FGS enhancement layer is signaled by a syntax element for each macroblock pair or for a subset of macroblock pairs in the FGS enhancement layer. For the macroblock pairs, for which the frame/field decision is not signaled, the frame/field decision is inferred by using already transmitted syntax elements. In one embodiment, a complete set of macroblock motion and prediction information is transmitted when the frame/field decision in the enhancement layer is different from the frame/field decision of the SNR base layer. A syntax element specifying the usage of a residual prediction from SNR base layer may be inferred to be equal to X, when the frame/field decision in the enhancement layer is different from the frame/field decision of the SNR base layer. At this, a value of X specifies that no residual prediction is applied and that the reconstructed residual signals is obtained by using only the transform coefficient levels of the current FGS enhancement layer. Alternatively, for both macroblocks of a macroblock pair, a syntax element may be transmitted when their frame/field decision in the enhancement layer is identical to the frame/field decision of the SNR base layer. This syntax element could specify whether a new macroblock motion and/or prediction information is transmitted in the FGS enhancement layer or whether the motion and/or prediction information of the co-located macroblock in the SNR base layer are used. The motion compensation for field macroblocks is performed on a field basis, whereas the motion compensation for frame macroblocks is performed on a frame basis. Similarly, the inverse transform for field macroblocks may be performed on a field basis, whereas the inverse transform for frame macroblocks may be performed on a frame basis. Further, similarly, the scan order of transform coefficients inside a transform block may be dependent on whether the macroblock is a field or a frame macroblock.

Lastly, it is noted that the syntax element for specifying the frame/field mode of a macroblock pair may be transmitted using conditioned entropy codes, where the condition is dependent on the frame/field mode of the co-located macroblock pair in the SNR base layer. For example, the syntax element 258 could be transmitted by means of an entropy code using a probability estimation that is dependent on the field/frame mode decision 212 in the base layer.

Finally, it is noted that the above embodiments were especially related to the H.264/MPEG4-AVC standard. However, the present invention is also applicable for to other coding schemes.

Depending on an actual implementation, the inventive coding scheme can be implemented in hardware or in software. Therefore, the present invention also relates to a computer program, which can be stored on a computer-readable medium such as a CD, a disc or any other data carrier. The present invention is, therefore, also a computer program having a program code which, when executed on a computer, performs the inventive method described in connection with the above figures.

Furthermore, it is noted that all steps indicated in the flow diagrams could be implemented by respective means and the implementations may comprise sub-routines running on a CPU, circuit parts of an ASIC or the like.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. A decoder for decoding an encoded precision-scalable data stream encoding a predetermined picture, the encoded precision-scalable data stream including first precision-encoded data having the predetermined picture encoded therein with a first precision by treating a predetermined portion of the predetermined picture a first one of frame-wise and field-wise, higher precision information representing second precision encoded data having the predetermined portion encoded therein with a second precision higher than the first precision by treating the predetermined portion a second one of frame-wise and field-wise, or refinement information enabling refining the first precision-encoded data to obtain the second precision-encoded data, and indication information indicating an absence or existence of a change in the frame-/field-wise treatment between the first precision-encoded data and the second precision-encoded data, the decoder comprising:

a checker for checking the indication information as to whether same indicates a change in the frame-/field-wise treatment of the predetermined portion between the first precision-encoded data and the second precision-encoded data;

an arranger for, if the indication information indicate the frame-/field-wise treatment change, disregarding, at least partially, the first precision-encoded data with respect to the predetermined portion and arranging, instead, the second precision-encoded data as data for decoding, or, based on the higher precision information, refining the first precision-encoded data to obtain the second precision-encoded data and arranging the obtained second precision-encoded data as data for decoding; and a decoder for decoding the arranged data for decoding by treating the predetermined portion of the predetermined picture the one of frame-wise or field-wise to reconstruct the predetermined picture with the second precision.

2. The decoder according to claim 1, further comprising a parser for parsing the encoded precision-scalable data stream to realize the first precision-encoded data and the higher precision information.

3. The decoder according to claim 2, wherein the parser is adapted to perform the parsing of the higher precision information depending on the indication information.

4. The decoder according to claim 1, wherein the predetermined picture is part of a video picture sequence and the decoder is adapted to extract motion information and respective residual information for the predetermined portion from the data for decoding, apply the motion information to reconstructed reference pictures to obtain a motion-compensated prediction for the predetermined portion, and reconstruct the predetermined portion based on the motion-compensated prediction and the residual information.

5. The decoder according to claim 4, wherein the decoder is adapted to perform an inverse spectral decomposition to extract the residual information.

6. The decoder according to claim 4, wherein the decoder is adapted to perform the application of the motion information and the reconstruction of the predetermined portion dependent on the indication information.

7. The decoder according to claim 1, wherein the arranger is adapted to disregard the second precision-encoded data and arrange the first precision-encoded data as data for decoding if an instruction to the decoder signals that the predetermined picture is to be reconstructed merely in the first precision.

8. The decoder according to claim 1, wherein the arranger is adapted to, if the indication information indicate the absence of a change in the frame-/field-wise treatment of the predetermined portion between the first precision-encoded data and the second precision-encoded data, check refinement change information in the encoded precision-scalable data stream as to whether the first precision-encoded data is to be refined with respect to the predetermined portion or not, and, depending on the check result, keep the first precision-encoded data as the data to be decoded with respect to the predetermined portion or refine, based on the high precision information, the first precision-encoded data to obtain the second precision-encoded data and arrange the obtained second precision-encoded data as the data to be decoded.

9. The decoder according to claim 1, wherein the indication information is signaled by a first syntax element associated with said predetermined portion and the predetermined picture comprises another predetermined portion, wherein the higher precision information lacks any second syntax element associated with said other portion for signaling an absence or an existence of a change in the frame-/field-wise treatment with respect to the other predetermined portion, wherein the checker is adapted to infer a value of the second syntax element by use of already checked syntax elements in the higher precision information.

10. The decoder according to claim 1, further comprising a second checker for, if the indication information indicates the absence of a change in the frame-/field-wise treatment with respect to the predetermined portion, checking a subordinate information in the higher precision information as to whether the second precision-encoded data includes motion information and/or residual information, and as to whether the second precision-encoded data is to replace the first precision-encoded data with respect to the predetermined portion or the second precision-encoded data is dedicated for refining the first precision-encoded data to obtain the second precision-encoded data, to obtain a check result, wherein the arranger is adapted to perform the disregarding and arranging or the refining and arranging with respect to the motion and/or residual information dependent on the check result.

11. The decoder according to claim 1, wherein the second precision-encoded data comprises transform coefficient levels of a transform coefficient matrix representing a motion-compensated residual of at least a portion of the predetermined portion, and wherein the parser is arranged to associate the transform coefficient levels to transform coefficients of the transform coefficient matrix according to their order of occurrence in the encoded precision-scalable data stream and a scan order among the transform coefficients, which is equal to one of a first and a second scan order different to the first scan order, dependent on the indication information.

12. The decoder according to claim 11, wherein the arranging and decoder are adapted to, if the indication information indicates the presence of a change in the frame-/field-wise treatment of the predetermined portion, apply an inverse transform to the transform matrix to obtain the motion-compensated residual, combine the motion-compensated residual with a field- or frame-wise portion of a reconstructed reference picture displaced from the predetermined portion by motion information indicated in the higher precision information or the first precision-encoded data to obtain a candidate reconstructed picture that is equal to the reconstructed picture in case of the second one of the frame-wise and field-wise being frame-wise, and, if the second one of the frame-wise and field-wise is field-wise, convert the candidate reconstructed picture from a field representation into a frame representation to obtain the reconstructed picture.

13. An encoder for encoding a predetermined picture, comprising:

a base encoder for, by treating a predetermined portion of a predetermined picture one of frame-wise or field-wise, encoding the predetermined picture with a first precision to obtain first precision-encoded data;

a determiner for determining higher precision information by treating the predetermined portion the other of frame-wise or field-wise, the higher precision information representing second precision-encoded data having encoded therein the predetermined portion with a second precision being higher than the first precision by treating the predetermined portion the other of frame-wise and field-wise or refinement information enabling refining the first precision-encoded data to obtain the second precision-encoded data; and a constructor for constructing an encoded precision-scalable data stream encoding the predetermined picture to include the first precision-encoded data, the higher precision information and indication information indicating a change in the frame-/field-wise treatment of the predetermined portion between the first precision-encoded data and the second precision-encoded data.

14. The encoder according to claim 13, wherein the predetermined picture further comprises another predetermined portion, and the higher precision information also represents other second precision-encoded data having the other predetermined portion encoded therein with the second precision by treating the other predetermined portion the one of frame-wise and field-wise or respective other refinement information enabling refining other first-precision encoded data having the other predetermined portion encoded therein with the first precision, wherein the determiner is adapted to determine the second-precision encoded data such that same comprise first transform coefficient levels of a first transform coefficient matrix representing a motion-compensated residual of the predetermined portion, and the other second precision-encoded data so that same comprise second transform coefficient levels of a second transform coefficient matrix representing a motion-compensated residual of the other predetermined portion, and the constructor being adapted to insert the first transform coefficient levels into the encoded precision-scalable data stream in accordance with a first scan order among the transform coefficients of the first transform coefficient matrix, and the second transform coefficient levels into the encoded precision-scalable data stream in accordance with a second scan order among the transform coefficients of the second transform coefficient matrix being different from the first scan order.

15. The encoder according to claim 13, wherein the constructor is adapted to perform the construction such that a correct parsing of the higher precision information depends on the indication information.

16. The encoder according to claim 13, wherein the predetermined picture is part of a video picture sequence and the base encoder and the determiner are designed such that the second-precision encoded data enables obtaining motion information and/or respective residual information for the predetermined portion from the encoded precision-scalable data stream, applying the motion information to already encoded and reconstructed reference pictures to obtain a motion-compensated prediction for the predetermined portion, and reconstructing the predetermined portion based on the motion-compensated prediction and the residual information.

17. The encoder according to claim 16, wherein the base encoder and the determiner are adapted such that an inverse spectral decomposition has to be performed to extract the residual information.

18. The encoder according to claim 16, wherein the base encoder and the determiner are adapted such that the application of the motion information and the reconstruction of the predetermined portion have to be performed dependent on the indication information.

19. The encoder according to claim 13, wherein the constructor is adapted such that the indication information indicates the absence of a change in the frame-/field-wise treatment of another predetermined portion of the predetermined picture, and the constructor and the determiner are adapted such that the encoded precision-scalable data stream comprises refinement change information indicating as to whether the first-precision encoded data is to be refined with respect to the other predetermined portion or not, and the higher precision information additionally represents further refinement information enabling refining the first precision-encoded data with respect to the other predetermined portion to obtain other second-precision encoded data encoding the predetermined portion with the second precision.

20. The encoder according to claim 13, wherein the constructor is adapted such that the indication information indicates the absence of a change in the frame-/field-wise treatment of another predetermined portion of the predetermined picture, the constructor and the determiner are adapted such that the encoded precision-scalable data stream comprises subordinate information in the higher precision information, indicating as to whether the higher precision information includes other second precision-encoded data including motion information and/or residual information for the other predetermined portion, and indicating as to whether the other second precision-encoded data is to replace the first precision-encoded data with respect to the predetermined portion or the other second-precision encoded data is dedicated for refining the first precision-encoded data with respect to the other predetermined portion to obtain the second-precision encoded data.

21. A method for decoding an encoded precision-scalable data stream encoding a predetermined picture, the encoded precision-scalable data stream including first precision-encoded data having the predetermined picture encoded therein with a first precision by treating a predetermined portion of the predetermined picture a first one of frame-wise and field-wise, higher precision information representing second precision encoded data having the predetermined portion encoded therein with a second precision higher than the first precision by treating the predetermined portion a second one of frame-wise and field-wise, or refinement information enabling refining the first precision-encoded data to obtain the second precision-encoded data, and indication information indicating an absence or existence of a change in the frame-/field-wise treatment between the first precision-encoded data and the second precision-encoded data, the method comprising the following steps:

checking the indication information as to whether same indicates a change in the frame-/field-wise treatment of the predetermined portion between the first precision-encoded data and the second precision-encoded data;

if the indication information indicate the frame-/field-wise treatment change, disregarding, at least partially, the first precision-encoded data with respect to the predetermined portion and arranging, instead, the second precision-encoded data as data for decoding, or, based on the higher precision information, refining the first precision-encoded data to obtain the second precision-encoded data and arranging the obtained second precision-encoded data as data for decoding; and decoding the arranged data for decoding by treating the predetermined portion of the predetermined picture the one of frame-wise or field-wise to reconstruct the predetermined picture with the second precision.

22. A method for encoding a predetermined picture, comprising the following steps:

by treating a predetermined portion of a predetermined picture one of frame-wise or field-wise, encoding the predetermined picture with a first precision to obtain first precision-encoded data;

determining higher precision information by treating the predetermined portion the other of frame-wise or field-wise, the higher precision information representing second precision-encoded data having encoded therein the predetermined portion with a second precision being higher than the first precision by treating the predetermined portion the other of frame-wise and field-wise or refinement information enabling refining the first precision-encoded data to obtain the second precision-encoded data; and constructing an encoded precision-scalable data stream encoding the predetermined picture to include the first precision-encoded data, the higher precision information and indication information indicating a change in the frame-/field-wise treatment of the predetermined portion between the first precision-encoded data and the second precision-encoded data.

* * * * *